United States Patent [19]

Hashimoto et al.

[11] Patent Number: 5,687,614
[45] Date of Patent: Nov. 18, 1997

[54] MAGNETIC SCREW DEVICE

[75] Inventors: Junichi Hashimoto; Yukito Kubo, both of Yao, Japan

[73] Assignee: Koyo Machine Industries Co., Ltd., Yao, Japan

[21] Appl. No.: 510,565

[22] Filed: Aug. 2, 1995

[30] Foreign Application Priority Data

Sep. 26, 1994 [JP] Japan .................................. 6-257442
Feb. 20, 1995 [JP] Japan .................................. 7-056461

[51] Int. Cl.⁶ .................................................. F16H 25/20
[52] U.S. Cl. ........................ 74/459; 74/89.15; 74/DIG. 4
[58] Field of Search ..................... 74/89.15, 424.8 R, 74/459, 89, DIG. 4

[56] References Cited

U.S. PATENT DOCUMENTS

| | | | |
|---|---|---|---|
| 4,280,603 | 7/1981 | Kanwar | 74/110 X |
| 5,456,134 | 10/1995 | Bouwer et al. | 74/89.15 |

FOREIGN PATENT DOCUMENTS

| | | | |
|---|---|---|---|
| 583035 | 2/1994 | European Pat. Off. | 74/89.15 |
| 50-88465 | 7/1975 | Japan . | |
| 52-28949 | 7/1977 | Japan . | |
| 55-45787 | 11/1980 | Japan . | |
| 58-26810 | 6/1983 | Japan . | |
| 1-176850 | 7/1989 | Japan . | |
| 6-2752 | 1/1994 | Japan | 74/89 |
| 5-52248 | 3/1994 | Japan | 74/DIG. 4 |
| 1333641 | 4/1971 | United Kingdom . | |

Primary Examiner—Charles A. Marmor
Assistant Examiner—Troy Grabow
Attorney, Agent, or Firm—Nikaido, Marmelstein, Murray & Oram LLP

[57] ABSTRACT

This magnetic screw device comprises a screw shaft made of magnetic material and having thread ridges formed on the outer peripheral surface thereof, and a nut body fitted on the screw shaft with a clearance defined therebetween. The nut body comprises a magnetic sleeve having a smoothly finished inner peripheral surface and substantially concentric with the screw shaft, and guide rings disposed at the opposite ends of the magnetic sleeve as viewed in the thrust direction, and a housing for holding the magnetic sleeve and guide rings. The magnetic sleeve is helically magnetized on its inner peripheral surface with magnetic poles opposed to the thread ridges of the screw shaft, so that when the screw shaft is rotated, the nut body 7 is linearly moved by the magnetic action.

16 Claims, 7 Drawing Sheets

MAGNETIC SCREW DEVICE

BACKGROUND OF THE INVENTION

1. Field of the Invention

The present invention relates to a magnetic screw device utilized in feed units used in machine tools and precision machines and instruments.

2. Prior Art

Feed units used in machine tools and precision machines and instruments are classified into two types, one utilizing a slide screw device or ball screw device and the other utilizing a magnetic screw device.

A feed unit utilizing a slide screw device or ball screw device, as disclosed for example in Japanese Utility Model Publication Nos. 40377/83 and 30511/85, comprises a screw shaft and a nut body, the arrangement being such that the rotative movement of the screw shaft is converted into the linear movement of the nut body by the slide contact between the thread track surfaces of the screw shaft and nut body or by the rolling contact of the balls.

A feed unit utilizing a magnetic screw device, as disclosed in Japanese Patent Kokai No. 176850/89, comprises a screw shaft of magnetic material having ridges and roots formed on the outer peripheral surface thereof, and a nut body fitted on said screw shaft with a clearance defined therebetween, with magnetic poles installed inside said nut body, the arrangement being such that the rotative movement of the screw shaft is converted into the linear movement of the nut body by the magnetic action of said magnetic poles.

However, conventional feed units using such slide screw device involve metal-to-metal contact between the screw shaft and the nut body to transmit movement from one member to the other. Therefore, the following problems arise.

That is, feed units utilizing slide screws are inevitably attended with friction resistance due to metal-to-metal contact and hence it is necessary to minimize the friction resistance by coating the thread track surfaces with a wear resisting material and lubricating them with a solid lubricant, grease or lubricating oil.

Further, even if the friction resistance can be minimized as by lubricants, naturally there is a limit thereto, and prolonged use involves generation of heat due to friction resistance, which heat causes the screw shaft to develop linear expansion, lowering the mechanical precision, and at the same time there are lowerings in mechanical precision and durability due to wear.

Another drawback is that various problems are raised including an environmental pollution due to the use of lubricants, such as grease, an environmental pollution due to dust particles resulting from wear of the contacting metal parts, and a noise problem due to vibration of the contacting metal parts.

On the other hand, feed units utilizing magnetic screw devices convert the rotative movement of the screw shaft into the linear movement of the nut body by the magnetic action of magnetic poles. Therefore, there is no need for direct contact between the screw shaft and the nut body and hence there is a merit that all the problems with the feed units utilizing slide screw devices or ball screw devices can be solved at a stroke, enabling the use of the device without a lubricant, preventing the environmental pollution due to wear and noise problems, and improving durability.

Furthermore, in the case where magnetic poles are installed on nut body side and the screw shaft is made of magnetic material, the range extending in the thrust direction in which magnetic poles are to be installed is reduced as compared with the case where they are installed on the screw shaft side; thus, there are merits that the manufacturing cost is low and that adhesion of iron powder particles or the like to the screw shaft can be prevented.

However, a conventional magnetic screw device uses a backup material having a number of magnets mounted thereon, such backup materials being helically fitted in the nut body in such a manner as to form the same number of threads and the same lead angle as those of the screw shaft; therefore, the manufacture of the nut body is very troublesome, leading to a sharp rise in the manufacturing cost.

Further, the conventional magnetic screw device has a number of small pieces of permanent magnet mounted on the backup material and the latter is helically fitted in the nut body; therefore, even if the backup material has been successfully assembled into the nut body by helically bending it, stated microscopically, the independent magnets are disposed at given intervals in the helical direction rather than the N- or S-poles are helically continuous with each other, with the result that the magnet area is too small to provide the sufficient magnetic action.

Therefore, the conventional magnetic screw device cannot attain the required thrust rigidity without increasing the size of the overall construction to increase the number of magnetic fluxes, and its application is limited to a light load handling field which does not require so high thrust rigidity; it cannot be employed in a field requiring a high degree of thrust rigidity.

SUMMARY OF THE INVENTION

A first object of the invention is to provide a magnetic screw device which prevents lowerings in precision and durability due to mechanical contact or friction, so that it can be used semipermanently with satisfactory precision maintained.

A second object of the invention is to provide a magnetic screw device which can be used for a long time without lubrication and which precludes the occurrence of environmental pollution due to lubricants and wear dust particles or noise problems due to vibration.

A third object of the invention is to provide a magnetic screw device which is simple in construction and which can be easily and inexpensively manufactured.

A fourth object of the invention is to provide a magnetic screw device which, though small in size, has substantial thrust rigidity, so that it can be satisfactorily used in a field requiring a high degree of thrust rigidity.

To attain these objects, a magnetic screw device according to the invention comprises a screw shaft made of magnetic material and having ridges formed on the outer peripheral surface thereof, a nut body fitted on said screw shaft with a clearance defined therebetween, and magnetic poles disposed inside said nut body. The nut body comprises a magnetic sleeve having a smooth inner peripheral surface and disposed substantially coaxially with said screw shaft, the inner peripheral surface of said magnetic sleeve being magnetized with said magnetic poles in a helical pattern corresponding to the thread ridges of the screw shaft. And when either the nut body or the screw shaft makes a rotative or linear movement, the other makes a linear or rotative movement by the magnetic action between the magnetic poles of the magnetic sleeve and the screw shaft. In other words, the rotative or linear movement of one member is converted into the linear or rotative movement of the other.

These and other objects of the invention will become more apparent upon a reading of the following detailed description and accompanying drawings. However, the accompanying drawings are for the purpose of illustration of embodiments only and are not intended to limit the scope of the invention.

DESCRIPTION OF THE PREFERRED EMBODIMENTS

Preferred embodiments of the invention will now be described in detail with reference to the drawings.

FIGS. 1 through 6 show a first preferred embodiment of the invention.

Figure 1:
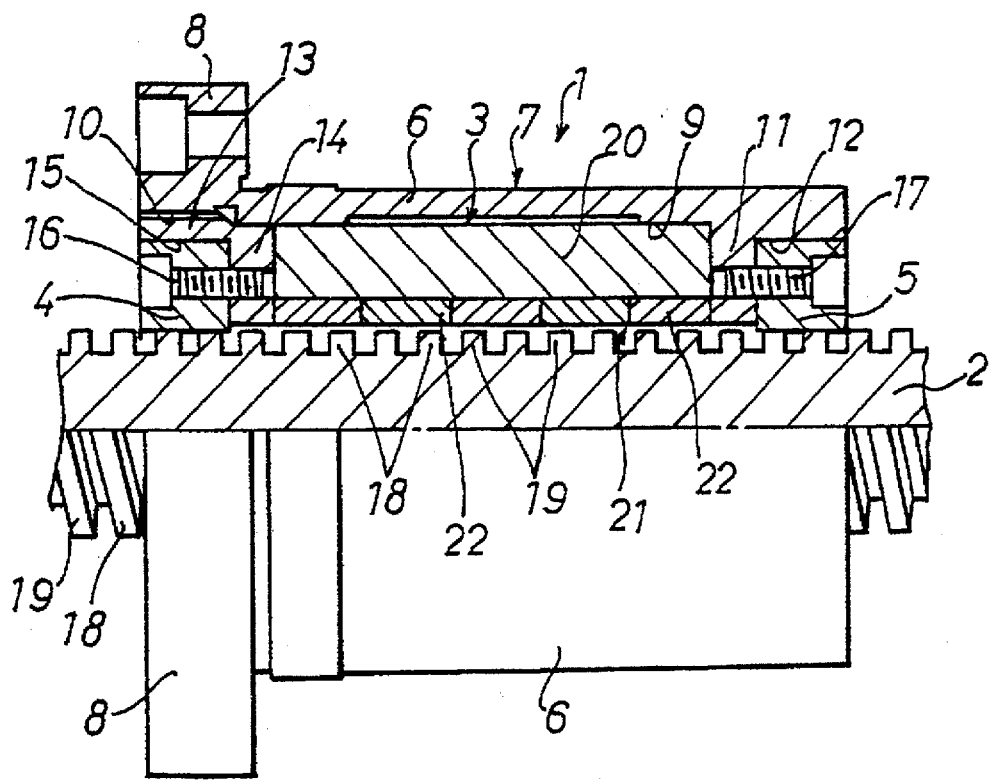
FIG. 1 is a front view of a magnetic screw device in its entirety showing a first embodiment of the invention, the upper half being shown in section.

This magnetic screw device 1, as shown in FIG. 1, comprises a screw shaft 2, a magnetic sleeve 3 fitted on said screw shaft 2 with a clearance defined therebetween, a pair of guide rings 4 and 5 disposed on the opposite sides of the magnetic sleeve 3 as viewed in the thrust direction, and a housing 6 holding the magnetic sleeve 3 and guide rings 4 and 5.

In addition, the magnetic sleeve 3, guide rings 4, 5 and housing 6 cooperate with each other to form a nut body 7.

The housing 6 is constructed of stainless steel which is nonmagnetic or weakly magnetic material in a sleeve form. Integrally formed on the outer periphery of the housing 6 at one end as viewed in the thrust direction is an attaching flange 8. The housing 6 is internally formed with a sleeve fitting portion 9 in the central region as viewed in the thrust direction, said sleeve fitting portion 9 being formed at one end thereof with an internally threaded hole 10 and at the other end with a ring fitting portion 12 delimited by a partition wall 11, said threaded hole 10 and ring fitting portion 12 being concentric with said sleeve fitting portion 9.

The magnetic sleeve 3 is removably fitted in the sleeve fitting portion 9 of the housing 6 and is fixed in position by the partition wall 11 and a nut 13 removably screwed in the internally threaded hole 10. The nut 13 is provided with a partition wall 14 for urging the magnetic sleeve 3 against the partition wall 11 of the housing 6 when the nut 13 is screwed into the internally threaded hole 10 of the housing 6, and a ring fitting portion 15 formed outwardly of said partition wall 14 as viewed in the thrust direction.

The guide rings 4 and 5 are fitted in the ring fitting portions 15 and 12 of the nut 13 and housing 6 coaxially with the magnetic sleeve 3 and removably fixed to the respective partition walls 14 and 11 peripherally by a plurality of screws 16 and 17 from outside in the thrust direction.

The screw shaft 2 is made of a magnetic material having a predetermined high mechanical strength and is formed on the outer periphery thereof with two helical lines of ridges 18 and 19 which have the same lead angle and same pitch. In addition, the ridges 18 and 19 are rectangular in cross section and the screw shaft 2 is of the square thread type.

Figure 2:
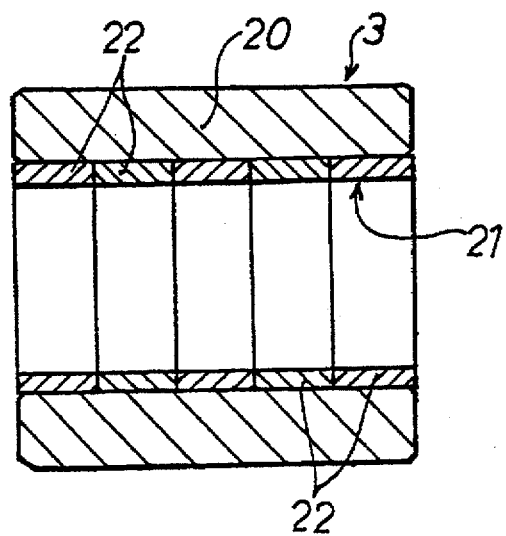
FIG. 2 is a sectional view of a magnetic sleeve showing the first embodiment of the invention.

The magnetic sleeve 3 is made of a magnetic material, such as magnetic metal material or rare earth magnet material. That is, in this first embodiment, the magnetic sleeve 3, as shown in FIG. 2, is of double construction, comprising an outer sleeve 20 constituting a cylindrical yoke, and a inner sleeve 21 fitted in said outer sleeve 20. And the inner peripheral surface of the inner sleeve 21 is smoothly machined to ensure that its inner diameter is substantially uniform throughout the length as viewed in the thrust direction.

Iron type metal materials, such as soft steel, are used for the outer sleeve 20. For the inner sleeve 21, use is made of rare earth magnet material, preferably neodymium magnet material containing neodymium, iron and boron. The inner sleeve 21 comprises a plurality of ring bodies 22 made of neodymium magnet material, said ring bodies 22 being fixedly fitted in the outer sleeve 20 with their end surfaces as viewed in the thrust direction abutting against each other.

In addition, in manufacturing this magnetic sleeve 3, a plurality of commercially available ring bodies 22 of neodymium magnet material are prepared, and the ring bodies 22, with an adhesive agent applied to either the outer peripheral surfaces of the ring bodies 22 or the inner peripheral surface of the outer sleeve 20 or both of them, are fitted and adhesively fixed in the outer sleeve 20, whereupon the inner peripheral surface of the inner sleeve 21 is smoothly machined over the ring bodies 22.

Employment of such manufacturing method allows utilization of commercially available ring bodies 22 of neodymium magnet material to produce the magnetic sleeve 3 easily and inexpensively while allowing the ring bodies 22 to be reliably fixed inside the outer sleeve 20 and the inner peripheral surface of the inner sleeve 21 to be smoothly finished.

Figure 3:
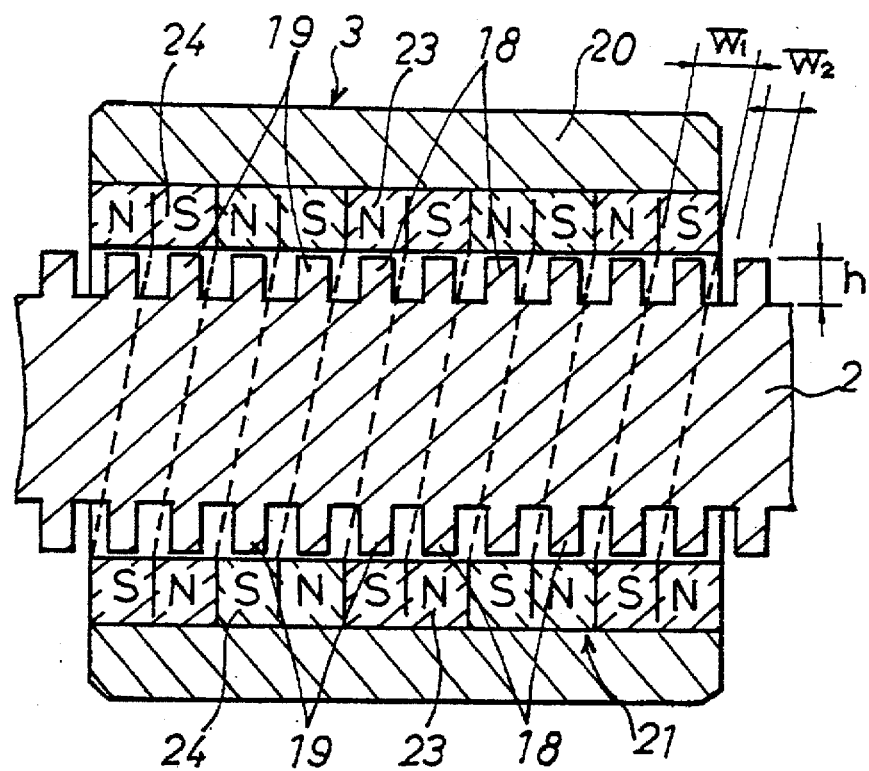
FIG. 3 is a sectional view showing the magnetized state of the magnetic sleeve according to the first embodiment of the invention.

The inner sleeve 21, as shown in FIG. 3, is helically continuously magnetized such that magnetic poles 23 and 24 for the N- and S-poles 23 and 24 are alternately formed in the inner peripheral surface thereof at given intervals in the thrust direction. The magnetic poles 23 and 24 are helical 17 continuous at the same lead angle and same pitch as those of the ridges 18 and 19 of the screw shaft 2 so that the N-poles 23 correspond to the ridges 18 and the S-poles 24 to the ridges 19.

The magnetic sleeve 3 is fitted on the screw shaft 2 with a slight clearance defined between the magnetic poles 23, 24 on the inner periphery and the ridges 18, 19 on the outer periphery of the screw shaft 2 and is held in position by the guide rings 4 and 5 on the opposite sides in non-contact concentric relation to the screw shaft 2. Therefore, the magnetic sleeve 3 and screw shaft 2 are relatively movable in the thrust direction and in the circumferential direction.

Between the screw shaft 2 and the magnetic sleeve 3, the N-poles 23 of the magnetic sleeve 3 correspond to the ridges 18 of the screw shaft 2 and the S-poles 24 of the magnetic sleeve 3 correspond to the ridges 19 of the screw shaft 2; therefore, over the entire range of the magnetic poles 23 and 24 in the helical direction, there are formed respective closed magnetic circuits extending from the N-poles 23 of the magnetic sleeve 3 via the ridges 18 and 19 to the S-poles 24 of the magnetic sleeve 3. And the screw shaft 2 is attracted over its entire periphery to the magnetic sleeve 3 on the outer side by the magnetic action of the N- and S-poles 23 and 24 in said magnetic circuits.

In addition, the magnetized width $W_1$ of the magnetic poles 23 and 24 of the inner sleeve 21 is greater than the width $W_2$ of the ridges 18 and 19 and is set such that when the magnetized width $W_1$ is taken to be 1, the ratio of the ridge width $W_2$ thereto is 0.5–0.7 or thereabouts. Further, the height h of the thread ridges 18 and 19 is set at about 1.3–1.7 times the magnetized width $W_1$. The width of the grooves between the ridges 18 and 19 is approximately equal to or somewhat greater than the width $W_2$ of the ridges.

The guide rings 4 and 5 are made of a nonmagnetic material such as nylon, polyacetal, fluoride resin or other synthetic resin having a wear resistance and a slide property, and the screw shaft 2 is fitted in said guide rings 4 and 5 so that it is slidable in the thrust direction and in the circumferential direction.

When this magnetic screw device 1 is to be incorporated in the feed unit of a machine tool, the screw shaft 2, for example, is operatively connected to the drive source, such as a motor, and the flange 8 of the housing 6 is fixed to a slide block or the like which is slidable in the thrust direction.

And the screw shaft 2 is rotated forward or backward around its axis by the drive source, such as a motor, whereupon, since the magnetic forces of the N- and S-poles 23 and 24 of the magnetic sleeve 3 act on the crests of the ridges 18 and 19, the magnetic sleeve 3 is moved in the thrust direction with the rotation of the screw shaft 2, thereby moving the slide block in the thrust direction.

At this time, the guide rings 4 and 5 slide along the outer periphery of the screw shaft 2 to guide the magnetic sleeve 3 along the screw shaft 2 in the thrust direction while maintaining the screw shaft 2 and the magnetic sleeve 3 in the non-contact state with the slight clearance maintained therebetween.

That is, magnetic forces of the helically extending N- and S-poles 23 and 24 of the magnetic sleeve 3 act from outside on the crests of the ridges 18 and 19 of the screw shaft 2 over the entire range in the helical direction through the slight clearance therebetween to exert attracting forces between the magnetic poles 23 and 24 of the magnetic sleeve 3 and the ridges 18 and 19 of the screw shaft 2, so that the screw shaft 2 is restrained in the thrust direction by said magnetic action.

Thus, when the ridges 18 and 19 are rotated in the circumferential direction by the rotation of the screw shaft 2, the magnetic poles 23 and 24 of the magnetic sleeve 3 corresponding to the ridges 18 and 19 tend to follow the rotation thereof, with the result that the magnetic sleeve 3 moves in the thrust direction in accordance with the lead angle of the ridges 18 and 19. For this reason, despite the facts that there is a slight clearance between the screw shaft 2 and the magnetic sleeve 3 and that they are in the non-contact state, it is possible to convert the rotative movement of the screw shaft 2 into the linear movement of the magnetic sleeve 3 by utilizing the magnetic action of the magnetic poles 23 and 24.

This magnetic screw device 1 has the following advantages.

In this magnetic screw device 1, the screw shaft 2 and the magnetic sleeve 3 are maintained in the non-contact state and hence there is no mechanical contact therebetween; therefore, the conventional problem of friction resistance can be solved. That is, since the arrangement is employed in which the screw shaft and the magnetic sleeve 3 are held in the non-contact state to utilize the magnetic action of the magnetic poles 23 and 24 disposed on the inner peripheral surface of the magnetic sleeve 3, there is no lowering in mechanical precision or durability due to friction as in the prior art; thus, the device can be used semipermanently while maintaining the high precision.

Further, since the screw shaft 2 and the magnetic sleeve 3 are out of contact with each other, inherently there is no need for lubrication and long-term oilless operation is possible. Another advantage is that environmental pollution due to lubricants and wear dust particles and noise problems due to vibration can be precluded. Therefore, the device is very effective for use in an environment where lubricants and wear dust particles are objectionable.

Further, in holding the screw shaft 2 and the magnetic sleeve 3 in the non-contact state, the guide rings 4 and 5 are provided on the opposite sides of the magnetic sleeve 3 to slidably guide the screw shaft 2 concentrically with the magnetic sleeve 3; therefore, the screw shaft 2 and the magnetic sleeve 3 can be reliably prevented from contacting each other and thus can be maintained in the non-contact state with a given slight clearance retained therebetween.

Further, since the magnetic sleeve 3 and guide rings 4 and 5 are fitted in the housing 6 with said guide rings 4 and 5 used to concentrically hold the screw shaft 2 and the magnetic sleeve 3 with a slight clearance defined therebetween, the magnetic screw device 1 in its entirety can be handled as a unit, making it very easy to handle the magnetic screw device 1 in incorporating the latter in a feed unit or the like.

Particularly, in incorporating it in a machine tool or the like, since there is no need to concentrically hold the screw shaft 2 and the magnetic sleeve 3 on the machine-associated side to secure a slight clearance therebetween, it is only necessary, with no need to pay attention to a clearance between the screw shaft 2 and the magnetic sleeve 3 during incorporation of the magnetic screw device 1, to incorporate in such a manner as not to induce distortion in the magnetic screw device 1; thus, the incorporating operation is very easy and the machine-associated guide mechanism becomes simple and its precision is not required.

Further, because of the construction in which the screw shaft 2 and the magnetic sleeve 3 are held in the non-contact state by the guide rings 4 and 5, the clearance between the screw shaft 2 and the magnetic sleeve 3 can be reduced to a minimum. For this reason, the magnetic action is increased between the magnetic poles 23 and 24 of the magnetic sleeve 3 and the thread ridges 18 and 19 of the screw shaft 2, making it possible to increase the torque to be transmitted from the screw shaft 2 to the magnetic sleeve 3.

Furthermore, since the screw shaft 2 and the magnetic sleeve 3 can reliably held in the non-contact state by the guide rings 4 and 5, there is no possibility of the ridges 18 and 19 of the screw shaft 2 coming into direct contact with the magnetic poles 23 and 24 of the magnetic sleeve 3, and the magnetic sleeve 3 can be reliably moved in the thrust direction in operative association with the rotation of the screw shaft 2 without the possibility of the magnetic sleeve 3 becoming unable to rotate owing to their mutual contact.

While the screw shaft 2 is held and slidably guided by the guide rings 4 and 5, the ridges 18 and 19 of the screw shaft 2 are helically continuous and the guide rings 4 and 5 are made of a nonmagnetic material such as nylon, polyacetal, polyimide, fluoride resin or other synthetic resin having a wear resistance and a slide property; therefore, the screw shaft 2 can be smoothly guided by the guide rings 4 and 5 and the durability of the guide rings 4 and 5 can be fully secured.

Further, since the guide rings 4 and 5 are made of a nonmagnetic material such as synthetic resin, there is no possibility of the magnetic flux passing through the guide rings 4 and 5, and entrance of iron and other dust particles into the magnetic sleeve 3 can be prevented by the guide rings 4 and 5.

The ring fitting portions 15 and 12 are located at the opposite ends of the housing 6 as viewed in the thrust direction and the guide rings 4 and 5 are fitted in said ring fitting portions 15 and 12 and removably fixed thereto by screws 16 and 17; therefore, the guide rings 4 and 5 can be easily installed in the housing 6 on the opposite sides of the magnetic sleeve 3. Further, since the guide rings 4 and 5 guide the magnetic sleeve 3 while sliding on the screw shaft 2 in the helical direction, the inner peripheries of the guide rings 4 and 5, if used for a long time, may sometimes wear owing to friction or vibration, no matter how superior in wear resistance and slide property the material may be which is used for the guide rings 4 and 5. Even in such case, however, the guide rings 4 and 5, which are removably installed by the screws 16 and 17, can be easily exchanged simply by removing the screws 16 and 17.

Since the inner periphery of the magnetic sleeve 3 is smoothly finished and is magnetized to helically provide the N- and S-poles 23 and 24, the construction is simple and manufacture is easy despite the presence of the magnetic poles 23 and 24.

Further, since the magnetic poles 23 and 24 are provided on the inner periphery of the magnetic sleeve and the screw shaft 2 is made of magnetic material and is helically formed with ridges 18 and 19 with the same lead angle and same pitch as those of the helical magnetic poles 23 and 24 of the magnetic sleeve 3, the screw shaft 2 can be easily machined, and at the same time there is no possibility of magnetic dust particles such as iron dust particles from outside adhering to the surface of the screw shaft 2.

Furthermore, since the magnetic poles 23 and 24 are on the inner periphery of the magnetic sleeve 3, there is no possibility of magnetic dust particles or the like from outside adhering thereto and since most of the magnetic flux from the magnetic poles 23 and 24 of the magnetic sleeve 3 passes through the screw shaft 2 in the inside, there is almost no leakage flux from the magnetic poles and 24 despite the utilization of the magnetic action, hardly causing problems due to leakage flux.

Further, since the magnetic poles 23 and 24 are on the magnetic sleeve 3 side, the range in the thrust direction in which the magnetic poles 23 and 24 are to be provided is determined irrespective of the stroke with which the magnetic sleeve 3 is linearly moved, and said range can be reduced as compared with the case where the magnetic poles 23 and 24 are provided on the screw shaft 2 side.

Since the inner sleeve 21 of neodymium magnet material is provided on the inner periphery of the magnetic sleeve 3 and is helically magnetized correspondingly to the ridges 18 and 19 of the screw shaft 2, as is clear from the test results to be later described, the thrust rigidity of the screw shaft 2 is very high, as compared with the case of using other magnetic materials, so that it can be satisfactorily used in an environment requiring high thrust rigidity.

Further, since the inner peripheral surface of the inner sleeve 21 is smoothly finished and this smooth inner peripheral surface is helically magnetized to provide magnetic poles 23 and 24, the magnetic poles 23 and 24 for the N- and S-poles 23 and 24 can be easily continuously provided on the inner periphery of the magnetic sleeve, as compared with the conventional case in which individual magnets are helically provided; thus, the construction is simple and manufacture is easy.

Particularly, the inner peripheral surface of the magnetic sleeve 3 is smoothly constructed to provide a uniform inner diameter throughout the length in the thrust direction, and is helically magnetized, the magnetic sleeve 3 can be freely magnetized such that the lead angle of the magnetic poles 23 and 24 is equal to the lead angle of the ridges 18 and 19 of the screw shaft 2, and the clearance therebetween can be maintained constant throughout the magnetic sleeve 3 to greatly improve the manufacturing accuracy.

Furthermore, since the inner peripheral surface of the magnetic sleeve 3 is helically magnetized to helically provide magnetic poles 23 and 24 for the N- and S-poles 23 and 24, the magnetic poles 23 and 24 can be easily continuously helically arranged with a fine pitch.

Thus, the aforesaid construction which is simple and which allows easy manufacture, coupled with the use of neodynium magnet material for the inner sleeve 21, improves accuracy and secures high thrust rigidity while reducing the size of the magnetic screw device 1 as a whole, as compared with the conventional case of helically arranging individual magnets.

That is, since the magnetic pole 23 and 24 can be helically continuously arranged with a fine pitch, the magnet area can be increased while reducing the overall size. Furthermore, since, within a given magnet area, the magnetic poles 23 and 24 for the N- and S-poles 23 and 24 and the ridges 18 and 19 can be increased in the number of lines, the thrust rigidity can be greatly improved.

Particularly, there are two lines of ridges 18 and 19 on the outer periphery of the screw shaft 2 and the N- and S-poles 23 and 24 are disposed on the inner periphery of said magnetic sleeve 3 such that one line of ridges 18 correspond to the N-poles 23 and the other line of ridges 19 correspond to the S-poles 24. For this reason, the ridges 18 and 19 and magnetic poles 23 and 24 are increased in the number of lines for the given magnet area and hence the thrust rigidity is increased.

Further, since the inner periphery of the magnetic sleeve 3 has the N- and S-poles 23 and 24 alternately disposed thereon corresponding to the two lines of ridges 18 and 19 of the screw shaft 2, the thrust rigidity is increased as compared with the case of magnetization such that the inner periphery has N- or S-poles alone. The reason is that if the N- and S-poles 23 and 24 are alternately arranged correspondingly to the ridges 18 and 19, there is formed between the magnetic sleeve 3 and the screw shaft 2 a magnetic circuit which passes through the N-poles 23, ridges 18, S-poles 24 and ridges 19, said magnetic circuit being helically formed with a fine pitch correspondingly to the entire range of the inner periphery of the magnetic sleeve 3.

The magnetic sleeve 3 is of double construction comprising the outer and inner sleeves 20 and 21 and the inner sleeve 21 is adhesively fitted in the outer sleeve 20, with the result that despite the fact that the inner sleeve 21 is constructed by using neodymium magnet material, which is brittle, the machining of the inner surface of the inner sleeve 21 is easy and the mounting and dismounting and other handling thereof with respect to the housing 6 for assembling and disassembling operation are easy.

With the magnetic sleeve 3 fitted in the sleeve fitting portion 9 of the housing 6, the outer sleeve 20 is fixed in position held between the partition wall 11 and the partition wall 14 of the nut 13; therefore, the magnetic sleeve 3 can be easily and reliably fixed in the housing 6, and there is no possibility of the clamping force directly acting on the inner sleeve 21 made of neodymium magnet material and disposed inside the outer sleeve 20, so that damage to the inner sleeve 21 can be prevented.

The nut 13 has the ring fitting portion 15 on the opposite side to the magnetic sleeve 3 with respect to the partition wall 14 and the guide ring 4 is fitted and fixed in said ring fitting portion 15; therefore, the dimension of the housing 6 in the thrust direction can be reduced as compared with the case of locating the guide ring 4 outwardly more remotely from the nut 13 in the thrust direction.

The inner sleeve 21 comprises a plurality of ring bodies 22 of unit length fitted in the outer sleeve 20 in the thrust direction; thus, it can be easily and inexpensively manufactured using commercially available ring bodies 22.

The width $W_2$ of the ridges 18 and 19 is smaller than the magnetized width $W_1$ of the magnetic poles 23 and 24 of the inner sleeve 21 and is set such that when the magnetized width $W_1$ is taken to be 1, the ratio of the ridge width $W_2$ thereto is 0.5–0.7 or thereabouts. This value of ratio increases the thrust rigidity.

The reason is that when this ratio is 0.5–0.7 or thereabouts, the magnetic flux from the magnetic poles 23 and 24 is concentrated on the crests of the ridges 18 and 19 and hence the magnetic flux density is high and at the same time the amount of leakage flux failing to pass through the crests of the ridges 18 and 19 can be reduced. In contrast, if the ratio is greater than 0.7, the leakage flux reduces but the magnetic flux density in the crests of the ridges 18 and 19 also reduces, while if it is less than 0.5, the leakage flux increases.

On the other hand, the height h of the thread ridges 18 and 19 is greater than the magnetized width $W_1$ of the magnetic poles 23 and 24 and is set such that when the magnetized width $W_1$ is taken to be 1, the ratio of the height h thereto is 1.3–1.7 or thereabouts. And this value of ratio also increases the thrust rigidity.

The reason is that when it is about 1.3–1.7 times the magnetized width $W_1$, the magnetic flux from the magnetic poles 23 and 24 is concentrated on the crests of the ridges 18 and 19 and hence the amount of leakage flux failing to pass through the crests of the ridges 18 and 19 can be reduced. If the height h of the ridges 18 and 19 is greater than 1.7 times the magnetized width $W_1$, the magnetic resistance of the screw shaft 2 increases and so does the amount of leakage flux and, reversely, if it is less than 1.3 times, the magnetic flux density in the ridges 18 and 19 lowers.

Various magnet materials can be used for the inner sleeve 21 of the magnetic sleeve 3. An inner sleeve 21 of neodymium magnet material and an inner sleeve 21 of manganese-aluminum magnet material were produced and tested for thrust rigidity. As a result, it was found that the use of neodymium magnet material improved the thrust rigidity up to about 5 times as compared with the use of manganese-aluminum magnet material.

Figure 4:
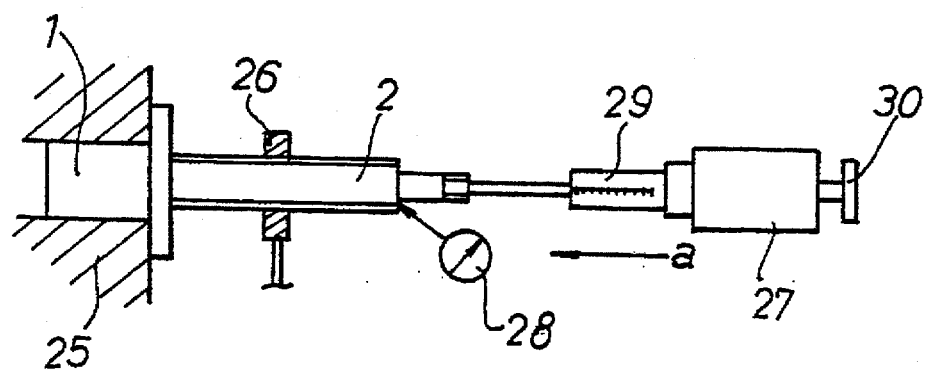
FIG. 4 is an explanatory view showing a thrust rigidity measuring method according to the first embodiment of the invention.

Two kinds of magnetic screw devices 1 different only in the magnet material of the inner sleeve 21 of the magnetic sleeve 3 were prepared. As shown in FIG. 4, such magnetic screw device 1 was mounted in the chuck of a dynamic torque measuring instrument 25, with the screw shaft 2 held by a rotation preventing member 26, and a dial gauge 28 and a spring scale 29 interposed between the screw shaft 2 and a tailstock 27, and a handle 30 was operated to press the screw shaft 2 in the thrust direction (direction of arrow a) to determine the relation between the displacement of the screw shaft 2 and pressure by means of the dial gauge 28 and spring scale 29.

In addition, the magnetized width $W_1$ is 2.0 mm and is arranged that when the screw shaft 2 is displaced more than 2.0 mm in the thrust direction, it steps out. Further, the magnetic flux density on the surface is 3,000 G.

Figure 5:
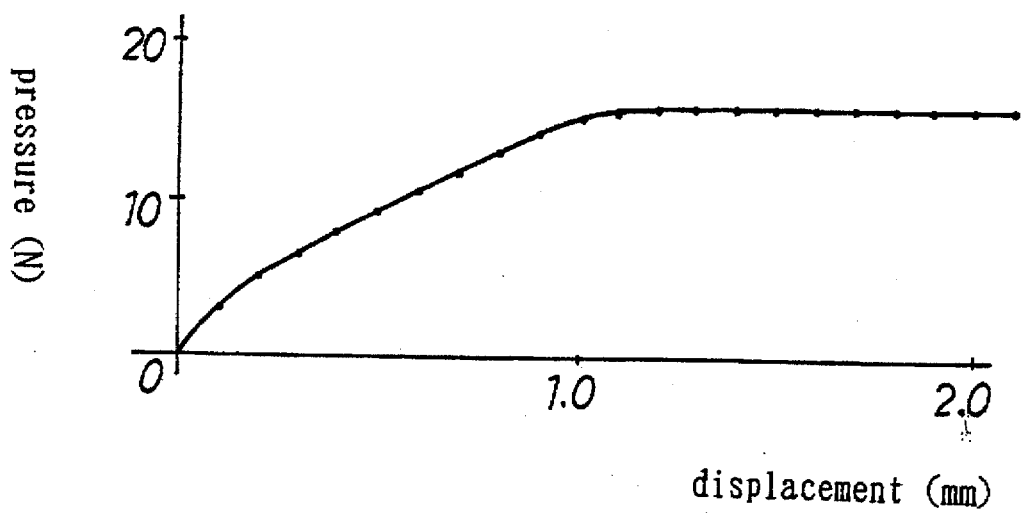
FIG. 5 is a graph showing the relation between displacement and pressure when neodymium magnet material is used for the magnetic sleeve according to the first embodiment of the invention.

FIG. 5 shows the results of measurement when neodymium magnet material is used for the inner sleeve 21, it being seen that when the displacement is 1.2 mm, the thrust load is 159.7N (=16.3 Kgf) and the thrust rigidity is 159.7N/ 1.2 mm (=16.3 Kgf /1.2 mm).

Figure 6:
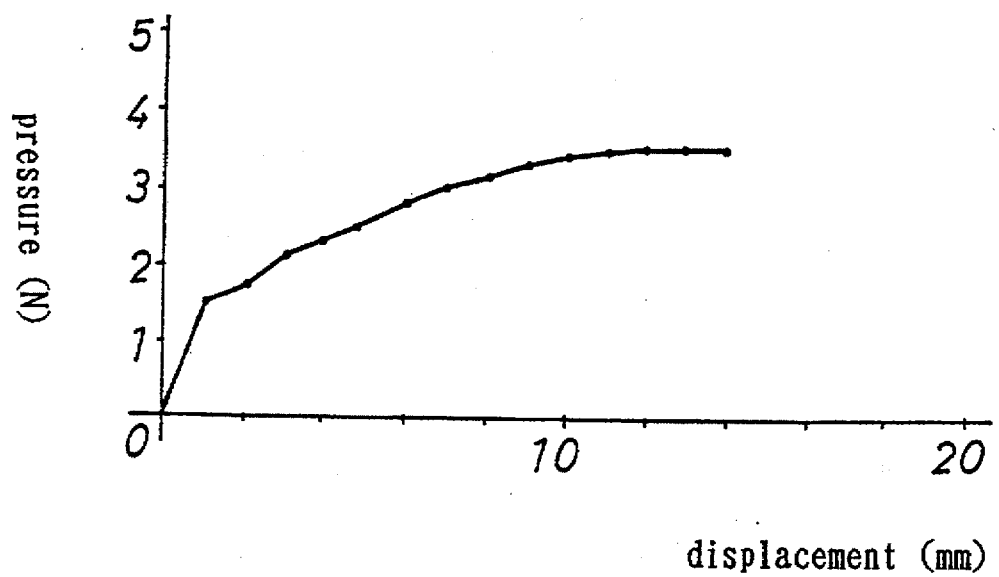
FIG. 6 is a graph showing the relation between displacement and pressure when manganese-aluminum magnet material is used for the magnetic sleeve according to the first embodiment of the invention.

FIG. 6 shows the results of measurement when manganese-aluminum magnet material is used for the inner sleeve 21, it being seen that when the displacement is 1.2–1.4 mm, the thrust load is 33.3N–34.3N (=3.4 Kgf–3.5 Kgf) and the thrust rigidity is 33.3N/1.2mm–34.3N /1.4 mm (=3.4 Kgf/1.2 mm–3.5 Kgf /1.4 mm).

Therefore, according to the results of measurement, when neodymium magnet material is used for the inner sleeve 21 of the magnetic sleeve 3, the thrust rigidity is improved by about 5 times as compared with the case of using manganese-aluminum magnet material.

Figure 7:
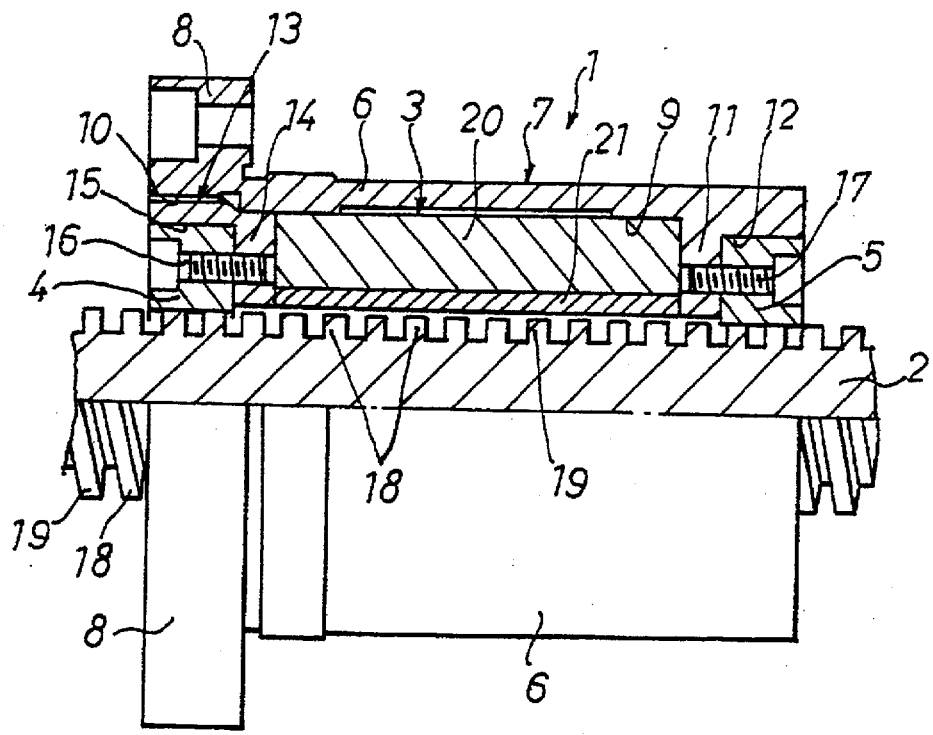
FIG. 7 is a front view of a magnetic screw device in its entirety showing a second embodiment of the invention, the upper half being shown in section.

FIG. 7 shows by way of example a second embodiment of the invention, wherein the inner sleeve 21 of the magnetic sleeve 3 is constructed of a cylindrical sleeve of integral construction throughout the length in the thrust direction.

In this case, it is necessary to prepare an inner sleeve 21 whose length depends on the length of the magnetic sleeve 3 in the thrust direction. However, since the inner sleeve 21 is one in number, the number of parts is reduced. As compared with the first embodiment using a plurality of ring bodies 22, there is no joint in the inner sleeve 21 itself, so that the magnetic poles 23 and 24 can be made helically continuous.

In addition, although neodymium magnet material is used for the inner sleeve 21, other magnetic materials may be used.

Figure 8:
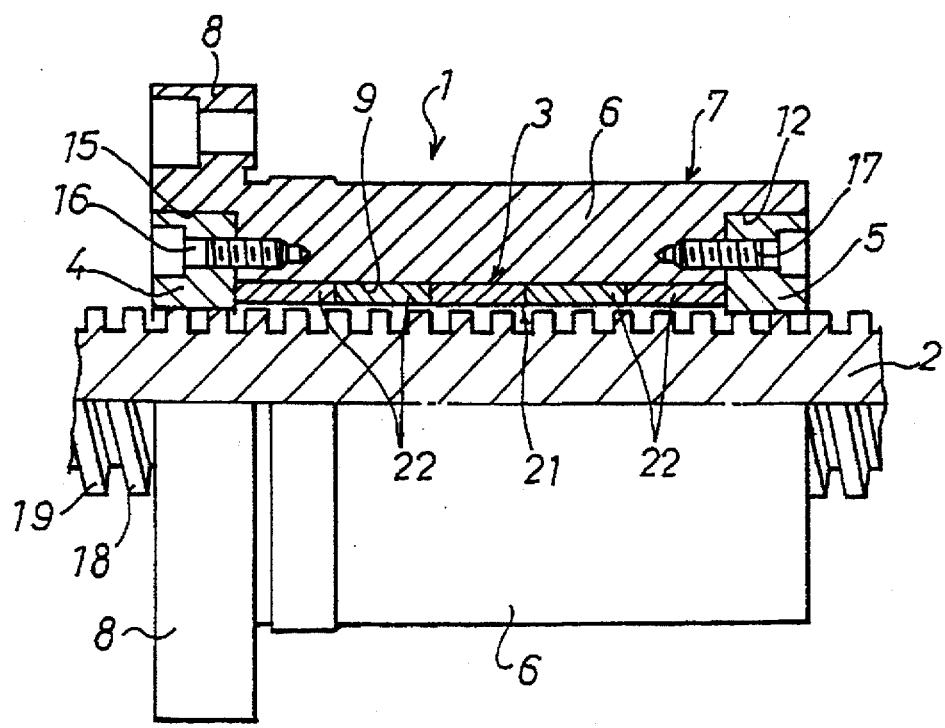
FIG. 8 is a front view of a magnetic screw device in its entirety showing a third embodiment of the invention, the upper half being shown in section.

FIG. 8 shows by way of example a third embodiment of the invention, wherein the housing 6 is thickened to omit the outer sleeve 20 and the magnetic sleeve 3 comprises an inner sleeve 21 which is composed of a plurality of ring bodies 22. The housing 6 is formed at the opposite ends thereof as viewed in the thrust direction with ring fitting portions 15 and 12 of larger diameter while a sleeve fitting portion 9 of smaller diameter is formed between said ring fitting portions 15 and 12. Further, guide rings 4 and 5 are fitted in the ring fitting portions 15 and 12 and fixed therein by screws 16 and 17, and the inner ring 21 composed of the plurality of ring bodies 22 is fitted in the sleeve fitting portion 9 in the thrust direction and adhesively fixed therein. The opposite ends of the inner sleeve 21 in the thrust direction abut against the guide rings 4 and 5.

As in this third embodiment, the magnetic sleeve 3 may be constructed of the inner sleeve 21 alone and may be fitted directly in the sleeve fitting portion 9 of the housing and adhesively fixed therein.

With this arrangement, since the guide rings 4 and 5 can be fixed to the housing 6 by screws 18 and 17, the construction of the magnetic screw device 1 can be made further simple. Further, since the opposite ends of the inner sleeve 21 as viewed in the thrust direction abut against the guide rings 4 and 5 to thereby restrain the inner sleeve 21, the latter is prevented by the guide rings 4 and 5 from slipping off.

In addition, in this embodiment, the inner sleeve 21, i.e., magnetic sleeve 3, is composed of a plurality of ring bodies 22; however, it may be made in the form of a cylindrical body which is integrated throughout the length in the thrust direction. Further, the magnetic sleeve 3 may be fixed in the housing 6 by the pair of guide rings 4 and 5.

Figure 9:
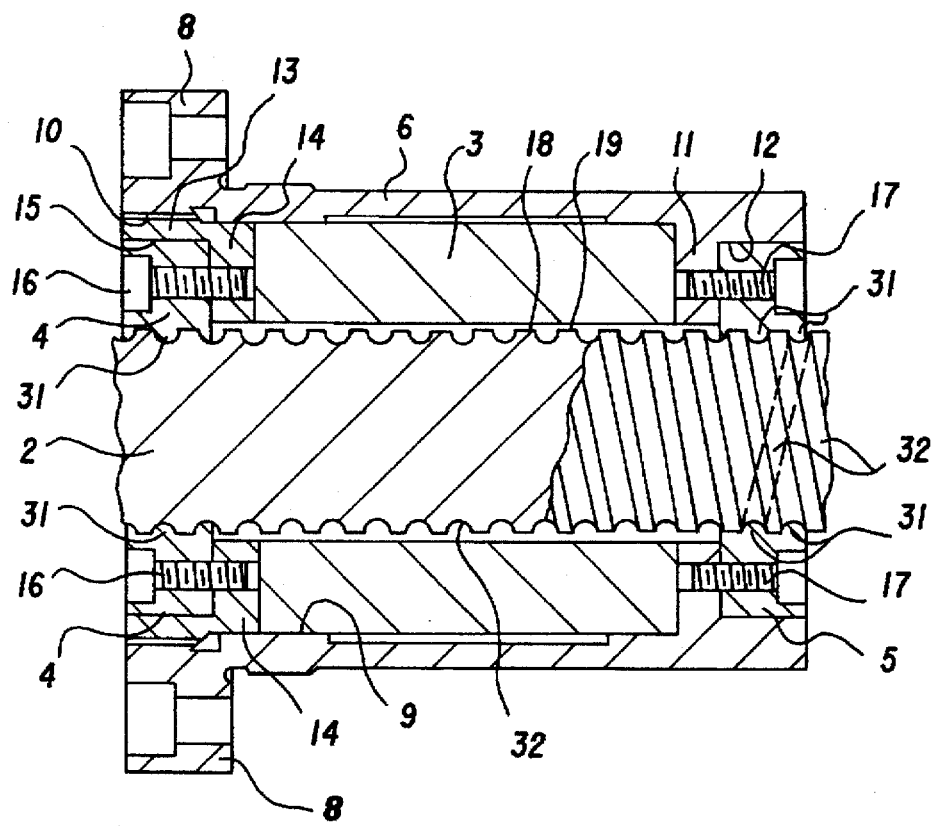
FIG. 9 is a sectional view of a magnetic screw device in its entirety showing a fourth embodiment of the invention, the screw shaft being shown partly broken away.

FIGS. 9 and 10 show by way of example a fourth embodiment of the magnetic screw device 1 according to the invention, wherein the inner peripheries of the guide rings 4 and 5 are formed with projections 31 for preventing step-out. The screw shaft 2 is helically formed with semi-circular thread grooves 32 between the ridges 18 and 19. The projections 31 integrally formed on the inner peripheries of the guide rings 4 and 5 slide in said thread grooves 32. The projections 31 are formed to extend long in the spiral direction of the thread grooves 32.

Figure 10A:
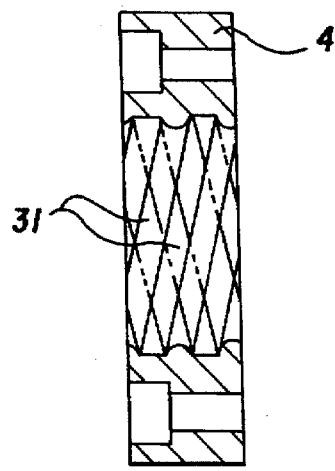
FIGS. 10A and B are sectional views of guide rings showing a fourth embodiment of the invention.
Figure 10B:
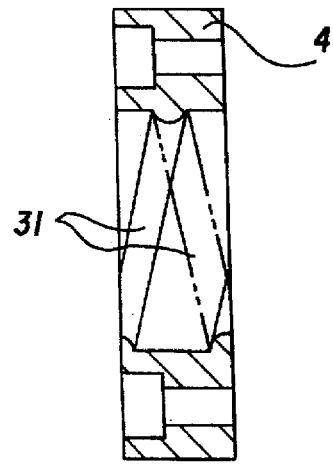

The projections 31 may be provided in two lines corresponding to the two lines of thread grooves 32 of the screw shaft 2, as shown in FIG. 10(A), or in a single line corresponding to either of the two lines of thread grooves 32 of the screw shaft 2, as shown in FIG. 10(B).

In addition, the magnetic sleeve 3 may be the same as in the first through third embodiments or it may be made as an integral body using a singe magnet material.

In this fourth embodiment, since the projections 31 for preventing step-out are helically formed on the guide rings and 5, they can prevent the step-out phenomenon between the screw shaft 2 and the magnetic sleeve 3 even when an excessive thrust load is temporarily applied. Therefore, torque can be smoothly and reliably transmitted from the screw shaft 2 to the magnetic sleeve 3 in the state in which the thread ridges 18 and 19 of the screw shaft 2 and the magnetic poles 23 and 24 of the magnetic sleeve 3 are constantly opposed to each other.

Furthermore, since the projections 32 are helical, damage to the projections 31 can be almost completely prevented, ensuring improved durability. Although the projections 31 are spiral, if the guide rings 4 and 5 are made of synthetic resin, the projections can be easily integrally formed during molding operation.

In addition, in this embodiment, each of the guide rings 4 and 5 is provided with projections 31; however, only one of them may be provided with such projections.

Figure 11:
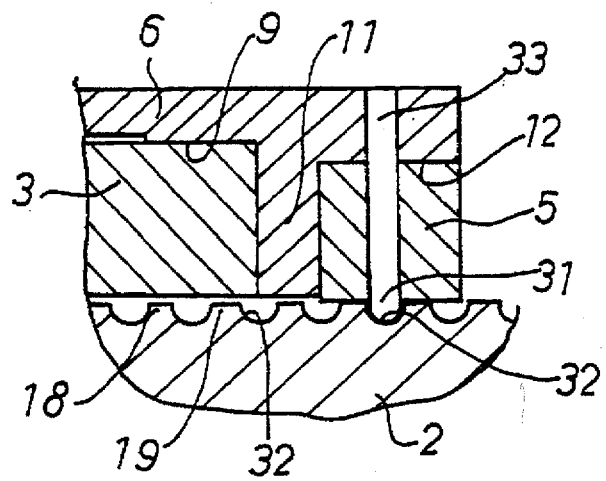
FIG. 11 is a principal enlarged sectional view of a magnetic screw device showing a fifth embodiment of the invention.

FIG. 11 shows by way of example a fifth embodiment of the magnetic screw device 1 according to the invention, wherein the projections 31 for preventing step-out are formed by pins 33. That is, the projections 31 are formed by pins 33 whose front ends are rounded. After the guide rings 4 and 5 have been fitted in the ring fitting portions 15 and 12, the projections 31 are inserted into the guide rings 4 and 5 from outside the housing 6 until their spherical portions at their front ends fit in the thread grooves 32.

The projections 31 for preventing step-out may be formed by the pins 33 in this manner. In this case, since the area of contact between the projections 31 and the grooves 32 can be reduced, the friction resistance can be prevented from increasing owing to the projections 31. Since the pins 33 extend through the housing 6 and guide rings 4 and 5, the guide rings 4 and S can be fixed in position by said pins 33, dispensing with the screws 16 and 17 used in the first embodiment.

Figure 12:
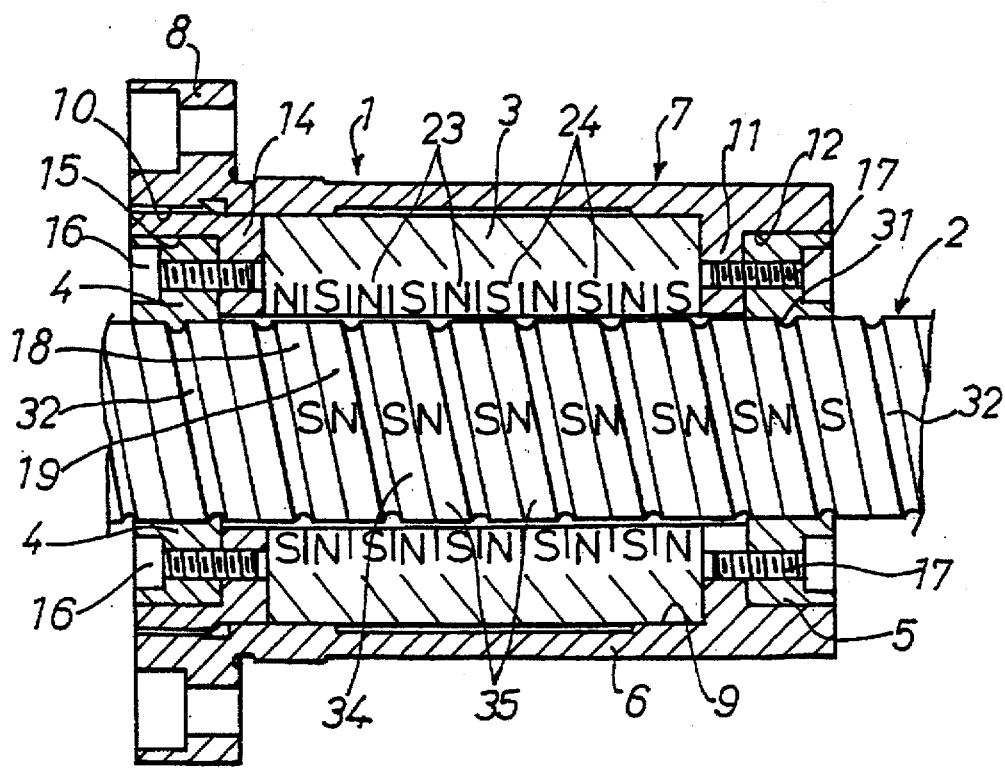
FIG. 12 is a sectional view of a magnetic screw device in its entirety showing a sixth embodiment of the invention.

FIG. 12 shows by way of example a sixth embodiment, wherein the ridges 18 and 19 of the screw shaft 2 are magnetized to helically provide S- and N-poles 34 and 35 corresponding to the N- and S-poles 23 and 24 of the magnetic sleeve 3, while the inner peripheries of the guide rings 4 and 5 are formed with step-out preventing projections 31 slidably fitted in the thread grooves 32.

In this embodiment, since the magnetic poles 34, 35 of the screw shaft 2 and the magnetic poles 23, 24 of the magnetic sleeve 3 are opposed with mutually opposite polarities to each other, great forces of attraction act between the magnetic poles 34, 35 and the magnetic poles 23, 24; thus, there is an advantage that the magnetic restraining force in the thrust direction between the screw shaft 2 and the magnetic sleeve 3 can be greatly increased.

Particularly, great forces of attraction between the magnetic poles 23, 24 and the magnetic poles 34 35 act over the entire length of the magnetic poles 23, 24 of the magnetic sleeve 3 in the helical direction; therefore, the magnetic action therebetween is increased to ensure transmission of greater torque.

Figure 13:
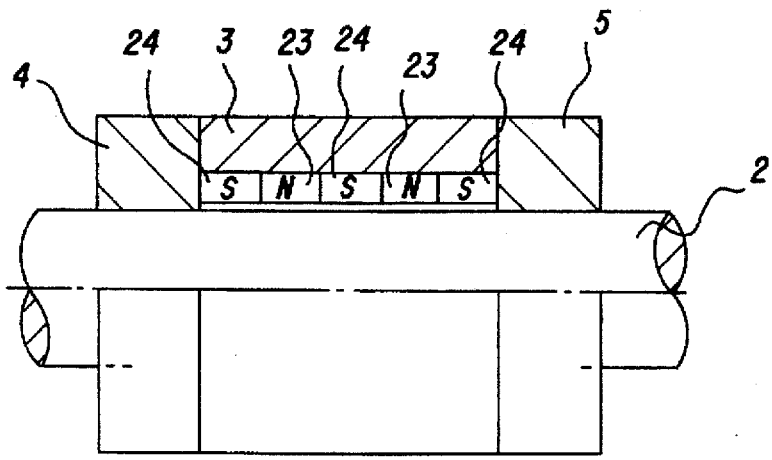
FIG. 13 is a front view of a magnetic screw device in its entirety showing a seventh embodiment of the invention, the upper half being shown in section.
Figure 14A:
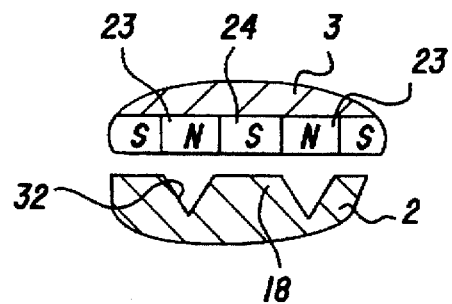
FIGS. 14A through C are principal enlarged sectional views of a magnetic screw device according to the seventh embodiment of the invention.
Figure 14B:
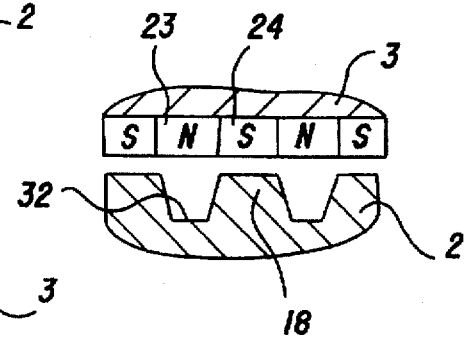
Figure 14C:
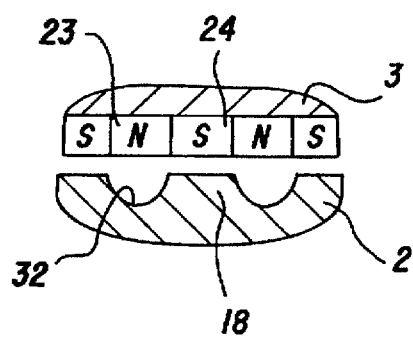

FIGS. 13 and 14 show by way of example a seventh embodiment of the invention. As shown in FIG. 13, this magnetic screw device 1 comprises a magnetic sleeve 3 whose smooth inner peripheral surface is helically magnetized to helically provide magnetic poles 23 and 24, guide rings 4 and 5 disposed on the opposite sides of the magnetic sleeve 3 and removably fixed thereto as by screws, and a screw shaft 2 externally formed with thread ridges 18.

The screw shaft 2, preferably, is one having a square thread having ridges 18 and 19 of square cross-section and grooves 32. However, constructions shown in FIG. 14(A)–(C) may be used. Each screw shaft 2 in FIG. 14(A)–(C) has ridges 18 formed trapezoidal or substantially trapezoidal. As for the shape of the grooves 32 of the screw shaft 2, there may be employed a V-shape shown in FIG. 14(A), a trapezoid in FIG. 14(B), or an arc in FIG. 14(C), or other shapes may be used.

In these cases, the same advantages as those in the preceding embodiments can be obtained.

Embodiments of the present invention have been described so far. However, the invention may be embodied with various changes applied thereto without departing from the scope and essential characteristic features of the invention.

For example, the guide rings 4, 5, the housing 6 and the like may be integrally constructed using a rigid resin material. In that case, the magnetic sleeve 3 may be put in a mold used for molding the housing 6 and then a synthetic resin material may be put therein, to mold the magnetic sleeve 3 with the housing 6 and the like.

The outer peripheral shape of the housing 6 may besides a circle be square. Further, the attaching flange 8 may be provided midway between the ends of the housing as viewed in the thrust direction.

The magnet materials used for the magnetic sleeve 3 are not limited to the embodiments and it is possible to use rare earth magnet material, rare earth cobalt magnet material, rare earth plastic magnet material and other various materials. However, if priority is given to improvement in thrust rigidity, rare earth magnet material, particularly neodymium magnet material is most desirable.

Further, each embodiment has been described with reference to the conversion of the rotative movement of the screw shaft 2 into the linear movement of the magnetic sleeve 3; however, if the screw shaft 2 is made movable in the thrust direction while the magnetic sleeve 3 is made rotatable, then it is possible to convert the rotative movement of the magnetic sleeve 3 into the linear movement of the screw shaft 2.

Therefore, the preferred embodiments described herein are for illustrative purposes only and the present invention is not limited to these embodiments.

The scope of the invention is shown by claims and all changes that fall under the meaning of claims are included in the invention.

What is claimed is:

1. A magnetic screw device comprising a screw shaft made of magnetic material and having ridges formed on the outer peripheral surface thereof, and a nut body fitted on the screw shaft with a clearance defined therebetween, said nut body having magnetic poles disposed on the inner periphery thereof, said magnetic screw device further comprising on the nut body side, a magnetic sleeve having a smoothly finished inner peripheral surface disposed substantially concentrically with said screw shaft, the inner peripheral surface of said magnetic sleeve being helically magnetized with said magnetic poles in opposed relation to the ridges of said screw shaft, and guide rings disposed on and attached to the opposite sides of said nut body as viewed in the thrust direction for holding said screw shaft substantially concentrically with said magnetic sleeve to slidably guide said screw shaft, wherein said nut body comprises the magnetic sleeve fitted on said screw shaft with a clearance defined therebetween, said guide rings disposed at the opposite ends of said magnetic sleeve as viewed in the thrust direction, and a housing for holding from the outer periphery side said magnetic sleeve and guide rings.

2. A magnetic screw device as set forth in claim 1, wherein at least one of said guide rings is formed with step-out preventing projections adapted to slidably fit in the grooves of said screw shaft.

3. A magnetic screw device as set forth in claim 1, wherein the outer periphery of said screw shaft is provided with two lines of ridges and the inner periphery of said magnetic sleeve is provided with N- and S-poles in such a manner that the N-poles are opposed to the ridges in one of said two lines of ridges and the S-poles are opposed to the ridges in the other line.

4. A magnetic screw device as set forth in claim 1, wherein said magnetic sleeve comprises an outer sleeve and an inner sleeve fitted in said outer sleeve.

5. A magnetic screw device as set forth in claim 4, wherein said inner sleeve is divided into a plurality of ring bodies in the thrust direction, and said ring bodies are fitted in said outer sleeve and adhesively fixed therein.

6. A magnetic screw device as set forth in claim 1, wherein the opposite ends of said housing as viewed in the thrust direction are internally formed with ring fitting portions, and said guide rings are fitted in said ring fitting portions.

7. A magnetic screw device as set forth in claim 6, wherein said housing is internally formed with a sleeve fitting portion, one end side of said sleeve fitting portion as viewed in the thrust direction being formed with an internally threaded hole and the other end side being formed with a partition wall, said magnetic sleeve being fitted in said sleeve fitting portion, and a nut is screwed into said internally threaded hole to clamp said magnetic sleeve in the thrust direction between said nut and said partition wall to thereby fix it to said housing.

8. A magnetic screw device as set forth in claim 7, wherein the outer side of said partition wall as viewed in the thrust direction is formed with a ring fitting portion, and said nut body is formed with a partition wall for pressing said magnetic sleeve against said partition wall and a ring fitting portion disposed outside said partition wall as viewed in the thrust direction, said guide rings being fitted in said ring fitting portions and removably fixed to said partition walls from outside as viewed in the thrust direction by screws.

9. A magnetic screw device as set forth in any one of claims 1, 6, 7 or 8, wherein an attaching flange is integrally formed on the outer periphery of said housing.

10. A magnetic screw device as set forth in any one of claims 1, or 4, wherein neodymium magnet material is used for at least the inner periphery of said magnetic sleeve.

11. A magnetic screw device as set forth in any one of claims 1, 4 or 5, wherein the magnetized width of the magnetized portions of said magnetic sleeve is greater than the ridge width on the outer periphery side of said ridges.

12. A magnetic screw device as set forth in any one of claims 1, 6 or 8, wherein the guide rings are made of a synthetic resin material.

13. A magnetic screw device as set forth in claim 1 or 3, wherein the ridges are magnetized with magnetic poles to be opposed to the magnetic poles of the magnetic sleeve such that magnetic poles of mutually opposite polarities are opposed to each other.

14. A magnetic screw device as set forth in any one of claims 1, 2, or 3, wherein the housing is formed at the opposite ends thereof as viewed in the thrust direction with ring fitting portions of larger diameter and a sleeve fitting portion of smaller diameter between said ring fitting portions, the guide rings being fixedly fitted in the ring fitting portions, and said magnetic sleeve is fitted in the sleeve fitting portion such that its opposite ends as viewed in the thrust direction abut against said guide rings.

15. A magnetic screw device as set forth in any one of claims 1, 2, or 3, wherein the $W_2$ or the ridges is 0.5–0.7 times the magnetized width $W_1$ of the magnetic poles of the inner sleeve.

16. A magnetic screw device as set forth in claim 15 wherein the height h of the ridges is 1.3–1.7 times said magnetic width $W_1$.

* * * * *